United States Patent
Aoki et al.

(10) Patent No.: US 11,160,211 B2
(45) Date of Patent: Nov. 2, 2021

(54) GRASS MOWER TILT DETECTION

(71) Applicant: KUBOTA CORPORATION, Osaka (JP)

(72) Inventors: Hideki Aoki, Duluth, GA (US); Akira Minoura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 341 days.

(21) Appl. No.: 16/223,647

(22) Filed: Dec. 18, 2018

(65) Prior Publication Data

US 2020/0187421 A1 Jun. 18, 2020

(51) Int. Cl.
*A01D 75/18* (2006.01)
*A01D 34/00* (2006.01)
*A01D 101/00* (2006.01)

(52) U.S. Cl.
CPC .......... *A01D 75/18* (2013.01); *A01D 34/006* (2013.01); *A01D 2101/00* (2013.01)

(58) Field of Classification Search
CPC ...... A01D 75/18; A01D 34/00; A01D 34/001; A01D 34/006; A01D 34/828; A01D 34/86; A01D 2101/00
See application file for complete search history.

(56) References Cited

U.S. PATENT DOCUMENTS

| | | | | |
|---|---|---|---|---|
| 8,165,759 | B2 * | 4/2012 | Boylston | A01D 75/28 701/45 |
| 8,352,116 | B2 * | 1/2013 | Boylston | G01C 9/00 701/29.1 |
| 9,459,097 | B2 * | 10/2016 | Davey | A01D 75/28 |
| 9,491,903 | B2 * | 11/2016 | Dwyer | A01D 34/824 |
| 9,679,419 | B2 * | 6/2017 | Dwyer | G07C 5/08 |
| 10,392,007 | B1 * | 8/2019 | Brown | G01C 21/18 |
| 10,730,510 | B2 * | 8/2020 | Ross | B60W 50/14 |
| 2005/0108999 | A1 * | 5/2005 | Bucher | A01D 75/28 56/10.2 R |
| 2005/0217230 | A1 * | 10/2005 | Bucher | A01D 75/28 56/10.2 R |
| 2010/0191408 | A1 * | 7/2010 | Boylston | A01D 75/28 701/31.4 |
| 2015/0260516 | A1 * | 9/2015 | Davey | B60W 40/10 701/36 |
| 2018/0160618 | A1 * | 6/2018 | Kawamoto | A01D 43/0631 |

\* cited by examiner

*Primary Examiner* — Adam J Behrens
(74) *Attorney, Agent, or Firm* — Greenblum & Bernstein, P.L.C.

(57) ABSTRACT

A grass mower includes a frame that extends in a front/rear direction of a machine body, a mower deck supported to/under the frame, the mower deck extending in a transverse direction of the machine body, a side edge of the mower deck protruding laterally from the machine body, a tilt detector for detecting a rolling angle of the machine body, a display device for displaying the rolling angle, a first informing device for effecting a first informing for calling attention to grass scraping by the side edge when a rolling angle detected by the tilt detector exceeds a first tilt angle and a second informing device for effecting a second informing for calling attention to traveling danger when the rolling angle detected by the tilt detector exceeds a second tilt angle.

5 Claims, 5 Drawing Sheets

GRASS MOWER TILT DETECTION

TECHNICAL FIELD

This invention relates to a grass mower configured to detect abnormal tilt of a vehicle body with using a tilt detector.

BACKGROUND ART

A grass mower according to U.S. Pat. No. 8,352,116 includes two tilt sensors and is configured such that based on signals from these tilt sensors, a falling angle of the vehicle body is calculated and if the falling angle exceeds a first value, an alarm will be issued and if the angle exceeds a second value, power stop is executed.

A grass mower according to U.S. Patent Application Publication No. 2005/0217230 includes a tilt sensor for detecting a machine body tilt angle and is configured such that if the machine body tilt angle exceeds a limit tilt angle, the PTO is intercepted to stop a rotary blade and also that a check tilt angle smaller than the limit tilt angle is set, and if the machine body tilt angle reaches this check tilt angle, an alarm will be issued to the driver.

A grass mower according to U.S. Patent Application Publication No. 2018/0160618 includes a tilt sensor for detecting a machine body tilt angle and a cut grass container and is configured such that when the tilt angle obtained by the tilt sensor exceeds an allowable tilt angle which depends on a weight of cut grass stored in a cut grass container, an alarm will be issued.

SUMMARY OF THE INVENTION

With the conventional grass mowers provided with a tilt angle sensor for detecting a machine (vehicle) body tilt angle, issuance of an alarm is used for preventing traveling danger such as machine body fall or turnover, etc. In the case of a grass mower having a mower deck mounted under a machine body, when the machine is traveling e.g. adjacent a border between a sloped grass-grown land (sloped grass-grown land having a large tilt angle) and a horizontal grass-grown land (sloped grass-grown land having a small tilt angle), tilting of the machine body can invite convenience that the grass may be cut inadvertently by a side edge of the mower deck which protrudes laterally from the machine body. Conventionally, prevention of such "grass scraping" phenomenon would rely solely upon driver's spontaneous attention.

A primary object of the present invention is to provide a grass mower that addresses not only to prevention of traveling danger due to machine body tilting, but also to prevention of inadvertent grass scraping.

A grass mower according to the present invention comprises:

a frame that extends in a front/rear direction of a machine body;

a mower deck supported to/under the frame, the mower deck extending in a transverse direction of the machine body, a side edge of the mower deck protruding laterally from the machine body;

a tilt detector for detecting a rolling angle of the machine body;

a display device for displaying the rolling angle;

a first informing device for effecting a first informing for calling attention to grass scraping by the side edge when a rolling angle detected by the tilt detector exceeds a first tilt angle; and a second informing device for effecting a second informing for calling attention to traveling danger when the rolling angle detected by the tilt detector exceeds a second tilt angle.

With this grass mower, the driver can check the rolling angle of the machine body by viewing the display device and can foresee traveling danger and possibility of grass scraping by the mower deck due to the machine body tilting. Moreover, even if the driver forgets checking of the rolling angle displayed on the display device, if the rolling angle of the machine body exceeds the first tilt angle at which one should look out for traveling danger or the second tilt angle at which one should look out for the possibility of grass scraping, the first informing or the second informing will be issued, so that through such informing, the driver can be made aware of such situation.

In case there exists possibility of falling or turnover of the machine body, tilting of the machine body to the second tilt angle would be more serious than the case of tiling of the machine angle to the first tilt angle at which there is the possibility of grass scraping. Therefore, if the driver finds it difficult to distinguish between the first informing and the second informing, the driver may overlook the situation of the machine body being tilted to the first tilt angle. Then, in order to avoid this problem, preferably, the first informing and the second informing are provided as being distinguishable from each other by the driver.

In the case of a compact grass mower, the space available for layout of instruments for assisting driving is limited. For this reason, preferably, the first informing device and the second informing device are accommodated in a common housing. This provides an advantage of space saving.

Even if the grass mower is traveling with a tilt on a tilted grass-grown land, as long as the side edge of the mower deck remains above the tilted grass-grown land, no grass scraping will occur. On the other hand, such grass scraping can occur e.g. when the grass mower is traveling adjacent a border between a tilted grass-grown land and a flat grass-grown land. Therefore, if the first informing as grass scraping alarm is issued in the course of traveling at an upper part of the grass-grown land where no grass scraping occurs, the driver will find this issuance as a nuisance. For this reason, preferably, an operational tool is provided for suspending the first informing only for a predetermined period.

DETAILED DESCRIPTION

Figure 1:
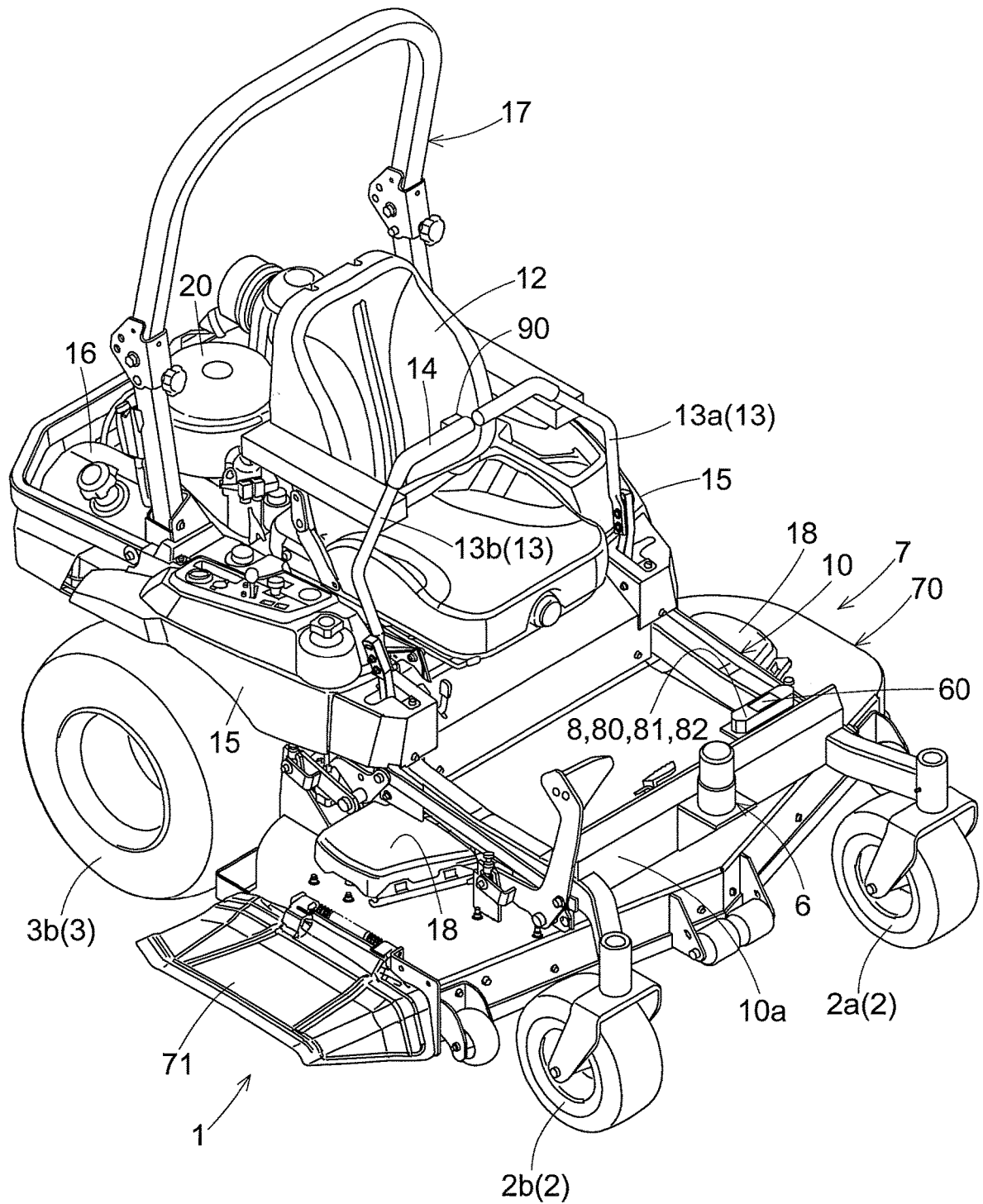
FIG. 1 is a perspective view of a grass mower.

Next, a grass mower according to the present invention will be explained with reference to the accompanying drawings. Incidentally, in this detailed description, unless explicitly indicated otherwise, the term "front" means the front side with respect to the vehicle body front/rear direction (traveling direction), and the term "rear" means the rear side with respect to the vehicle body front/rear direction (traveling direction). Also, the language "left/right direction" or "lateral direction" means the vehicle body transverse direction (machine body width direction) perpendicular to the machine body front/rear direction. The term "upper" or "lower" refers to positional relationship with respect to the perpendicular (vertical) direction of the vehicle body, denoting the ground clearance relationship.

This grass mower includes a vehicle body 1 supported on the ground by a front wheel unit 2 configured as a caster unit and a rear wheel unit 3. This grass mower is configured as a so-called zero-turn mower configured such that a left rear wheel 3a and a right rear wheel 3b together constituting the rear wheel unit 3 can be controlled independently of each other in their forward/reverse speeds. The front wheel unit 2 includes a pair of left and right front wheels 2a, 2b. The principal component of the vehicle body 1 is a frame 10 constituted of angular pipe, etc. Between the front wheel unit 2 and the rear wheel unit 3, a mower unit 7 is suspended from the frame 10 to be liftable up/down.

The mower unit 7 includes a mower deck 70 of a side discharge type and a discharge cover 71 provided on the cut grass discharging side of the mower deck 70.

The frame 10 extends in the front/rear direction and at a center portion of the frame 10, a driver's seat 12 is provided. On a top face of a front portion of the frame 10, a floor plate is laid to be used as a footrest for the driver. At a rear portion of the body frame 10, there are provided an engine 20 which is an internal combustion engine and engine auxiliary devices. The engine 20 is mounted under a posture with its engine output shaft 21 (see FIG. 2) protruding downwards. At a side of the engine 20, a fuel tank 16 is mounted.

On the left and right sides of the seat 12, fenders 15 are provided. On top faces of the fenders 15, there are arranged user operation devices such as various operation levers and operation buttons, etc. Rearwardly of the seat 4, an arch-shaped ROPS 17 is disposed vertically.

A maneuvering unit 13 which is one of user operation devices includes a left maneuvering lever 13a disposed on the left side of the seat 12 and a right maneuvering lever 13b disposed on the right side of the seat 12. The left maneuvering lever 13a is used for adjusting a rotational speed of the left rear wheel 3a. The right maneuvering lever 13b is used for adjusting a rotational speed of the right rear wheel 3b. The left maneuvering lever 13a and the right maneuvering lever 13b are pivotally displaceable to/across a forward speed changing range, neutral position and a reverse speed changing range. At the leading end portion of the right maneuvering lever 13b, there is provided a cancelling button 90 which will be described later, this button being operable by the thumb of the user's hand gripping the right maneuvering lever 13b.

Figure 2:
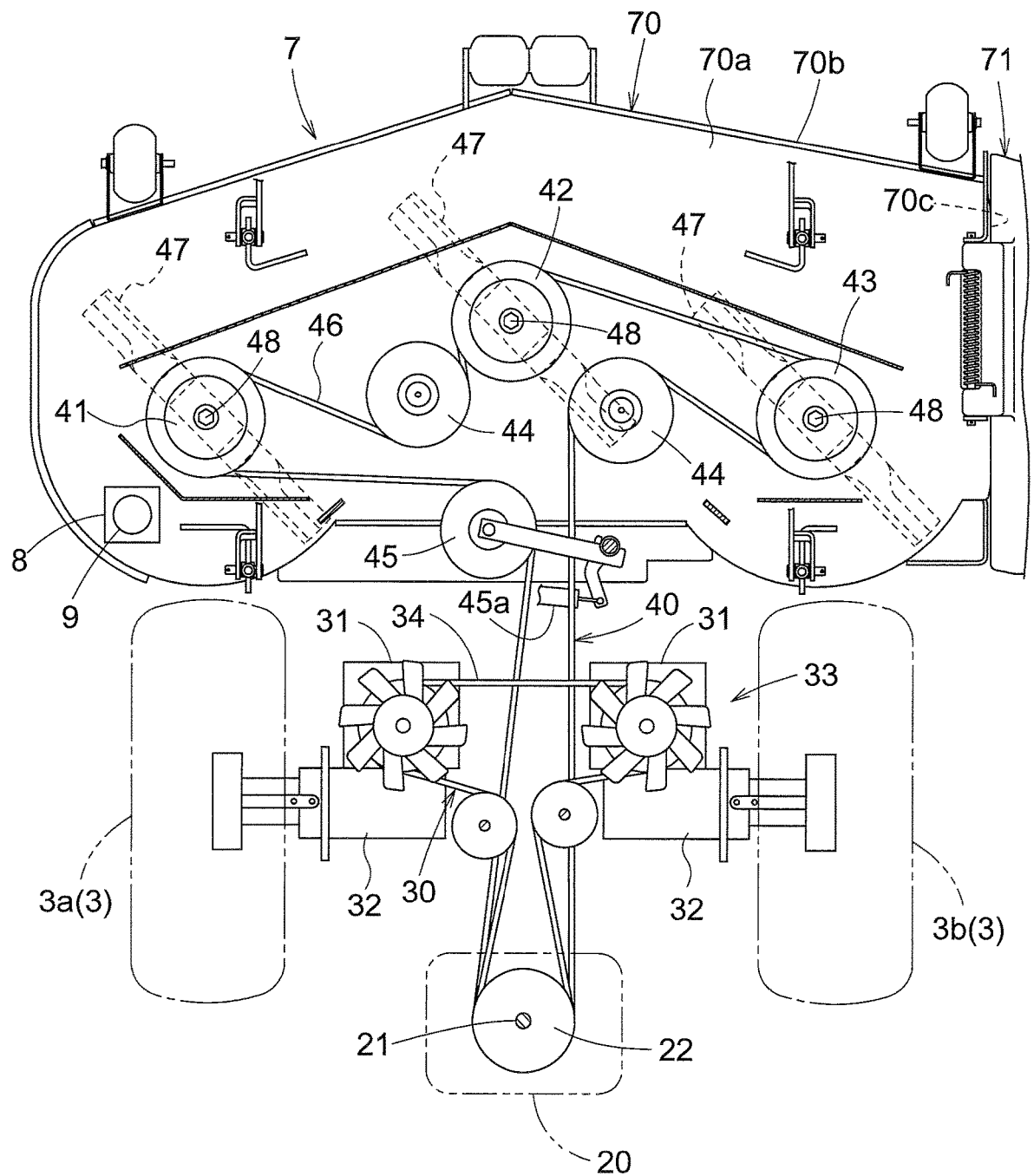
FIG. 2 is a plan view of a mower deck.

FIG. 2 schematically shows a power transmission system of this grass mower. The power transmission system includes a traveling transmission mechanism 30 for transmitting engine power to the rear wheel unit 3 and a work transmission mechanism 40 for transmitting engine power to the mower unit 7. Power from the engine 20 is outputted from two upper and lower stages of output pulleys 22 attached to the engine output shaft 21.

The traveling transmission mechanism 30 includes a pair of left and right HST's (hydrostatic transmission) 31, a pair of left and right gear transmission mechanisms 32 and a traveling belt transmission mechanism 33. The traveling belt transmission mechanism 33 transmits power outputted from the output pulleys 22 to the HST's 31 via a traveling belt 34. The gear transmission mechanisms 32 transmit power speed-changed by the HST's 31 to the left rear wheel 3a and the right rear wheel 3b.

Speed changing operations of the left and right HST's 31 are effected in response to control signals which are generated based on pivotal operations on the left maneuvering lever 13a and the right maneuvering lever 13b. More particularly, in response to user operations on the left maneuvering lever 13a and the right maneuvering lever 13b, there are realized a stopped state, a straight traveling state, a slow turning state, a pivot turning state and a spin turning state, respectively. The stopped state is realized by stopping the left rear wheel 3a and the right rear wheel 3b. The straight traveling state is realized by rotatably driving the left rear wheel 3a and the right rear wheel 3b at an equal speed forwardly or reversely. The slow turning state is realized by rotatably driving the left rear wheel 3a and the right rear wheel 3b at different speeds forwardly or reversely. The pivot turning state is realized by stopping one of the left rear wheel 3a and the right rear wheel 3b and rotatably driving the other forwardly or reversely. The spin turning state is realized by rotatably driving one of the left rear wheel 3a and the right rear wheel 3b forwardly and rotatably driving the other reversely.

As may be apparent from FIG. 2, the mower unit 7 includes the mower deck 70 consisting essentially of a top plate 70a and a side plate 70b. As the side plate 70b includes only a front plate, a rear plate and a left side plate. The right side of the mower deck 70 remains as an opening, which serves as a cut grass discharging outlet 70c.

In the inner space of the mower deck 70, as indicted by dotted lines in FIG. 2, there are provided three blades 47 disposed side by side in the machine body transverse direction. Each blade 47 is fixed to a rotational shaft 48 rotatably supported to the top plate 70a of the mower deck 70. For transmitting power from the output pulleys 22 of the engine 20 to the respective rotational shafts 48, the work (implement) transmission mechanism 40 is provided. This work transmission mechanism 40 is configured as a work belt transmission mechanism. This work transmission mechanism 40 includes input pulleys 41, 42, 43 fixed to the rotational shafts 48 of the respective blades 47, a direction changing pulley 44, a tension clutch pulley 45 as an implement clutch and an implement belt 46 wound around these pulleys. With this arrangement in operation, each blade 47 is rotated at a rotational speed in proportion to an engine rotational speed. The tension pulley 45 is switched over to an engaged state or a disengaged state by a clutch solenoid 45a.

As shown in FIG. 1, the left side input pulley 41 and the right side input pulley 43 are exposed, so these are covered by a protection cover 18 from the above.

As shown in FIG. 1, a tilt detector 8 is provided on a top face at the front end portion of the left fender 15. In the instant embodiment, the tilt detector 8 includes a sensor for detecting a rolling angle as a machine body tilt angle. And, a display device 60 for displaying such machine body tilt angle is provided on a surface of a case which accommodates a rolling sensor 81.

Further, on a top portion of a front cross beam 10a of the frame 10, there is provided an informing device 6. In the instant embodiment, this informing device 6 is an alarm lamp incorporating an orange-colored lamp function as a first informing device 61 and a red-colored lamp functioning as a second informing device 62. Other colors may be employed for the colors of these alarm lamps. Further, the first informing device 61 and the second informing device 62 may be provided as separate entities, which may be disposed at different positions from each other. Also, the first informing device 61 and the second informing device 62 may be constituted of other alarm devices such as buzzers, speakers, etc.

Figure 3:
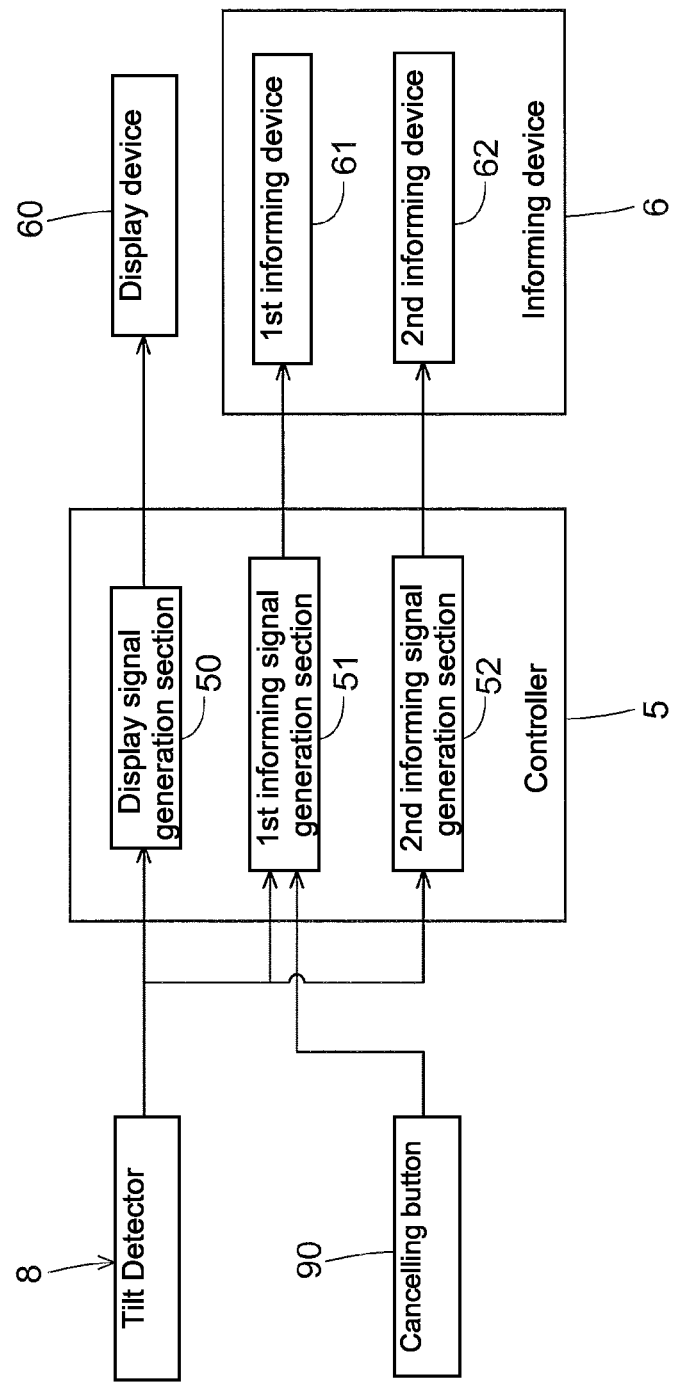
FIG. 3 is a functional block diagram of a tilt informing control system.

As shown in FIG. 3, a controller 5 for processing rolling angle signals detected by the tilt detector 8 and indicating a rolling angle includes a display signal generation section 50, a first informing signal generation section 51 and a second informing signal generation section 52. To the display signal generation section 50, the first informing signal generation section 51 and the second informing signal generation section 52, rolling angle signals from the tilt detector 8 are sent.

The display signal generation section 50 generates a display signal for the display device 60, based on the rolling angle signal. Then, in response to this display signal, the display device 60 displays a tilt angle (to be referred to as a machine body tilt angle for short, corresponding to the rolling angle) of the machine body 1 in the transverse direction thereof in the form of a numeric value or a graphic tilt indicator.

Figure 4:
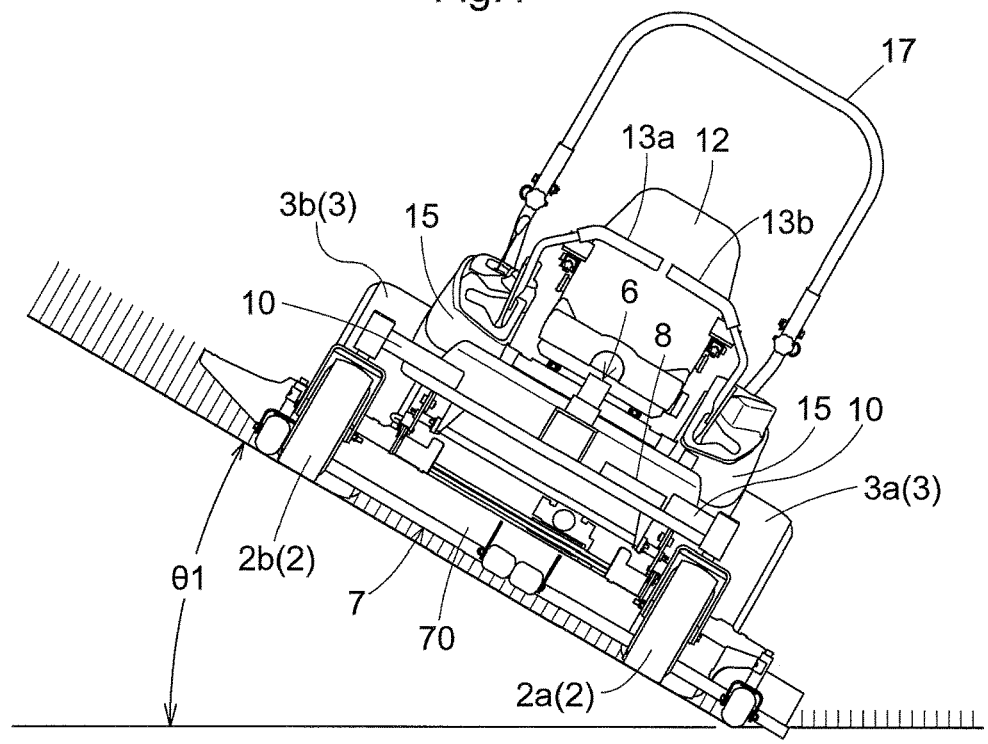
FIG. 4 is a front view of the grass mower which travels at a machine body tilt angle near a first tilt angle.

In the first informing signal generation section 51, there is set in advance a first tilt angle as a machine body tilt angle involving possibility of occurrence of grass scraping (inadvertent scraping off of the grass-grown land resulting from accidental contact between the side edge of the mower deck 70 and the grass-grown land). The first informing signal generation section 51 checks whether the machine body tilt angle based on the rolling angle signal exceeds the first tilt angle or not. FIG. 4 shows the grass mower traveling with a machine body tilt angle (denoted by θ1 in FIG. 4) which is slightly larger than the first tilt angle. Therefore, the first tilt angle is an angle indicating a situation immediately prior to occurrence of such grass scraping accident. Then, if the machine body tilt angle exceeds the first tilt angle, the first informing signal is generated. This first informing signal is a driving signal for driving the first informing device 61 and in this embodiment, this signal is a signal which causes illumination of the orange colored lamp as the first informing device 61. If the first informing device 61 is configured as a buzzer, a speaker, etc., then, this driving signal will be a sound/voice signal that alarms grass scraping via the buzzer, the speaker, etc.

The first informing signal generation section 51 is connected to the cancelling button 90 as an operational tool for suspending the first informing only for a predetermined period. When the cancelling button 90 is operated, a cancelling signal will be inputted to the first informing signal generation section 51. Then, for duration of the predetermined period after the receipt of the cancelling signal, the first informing signal generation section 51 suspends its generation of the first informing signal. With this, even at a machine body tilt angle exceeding the first tilt angle, the first informing (informing of grass scraping alarm) will not be effected and the grass mower keeps traveling. This arrangement is advantageous at time of traveling on a sloped grass-grown land where no grass scraping will occur.

Figure 5:
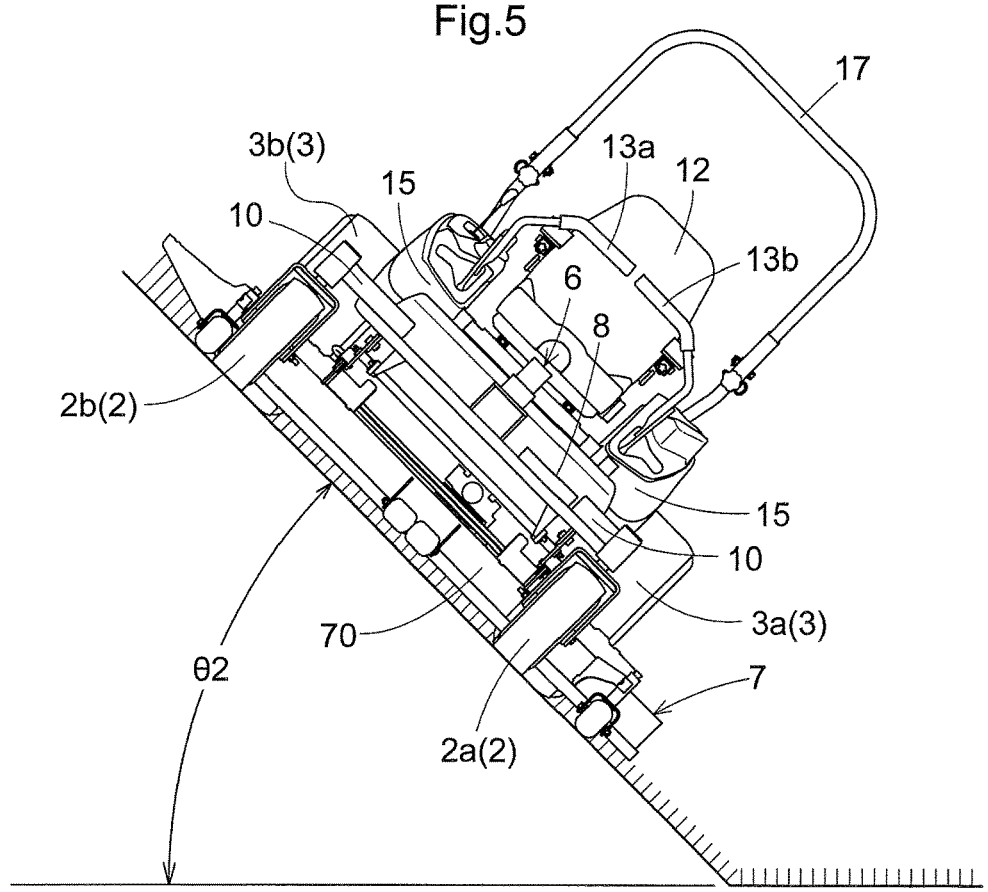
FIG. 5 is a front view of the grass mower which travels at a machine body tilt angle near a second tilt angle.

In the second informing signal generation section 52, there is set in advance a machine body tilt angle set for the purpose of prevention of traveling danger such as machine body slippage as the second tilt angle. The second informing signal generation section 52 checks whether the machine body tilt angle based on the rolling angle signal exceeds the second tilt angle or not. FIG. 5 shows the grass mower traveling with a machine body tilt angle (denoted by θ2 in FIG. 5) which is slightly larger than the second tilt angle. Therefore, the second tilt angle is an angle indicating a situation immediately prior to occurrence of traveling danger such as machine body slippage. Then, if the machine body tilt angle exceeds the second tilt angle, the second informing signal is generated. This second informing signal is a driving signal for driving the second informing device 62 and in this embodiment, this signal is a signal which causes illumination of the red colored lamp as the second informing device 62. If the second informing device 62 is configured as a buzzer, a speaker, etc., then, this driving signal will be a sound/voice signal that alarms grass scraping via the buzzer, the speaker, etc.

As the tilt detector 8, various types such as a type using an acceleration sensor for detecting the rolling angle with utilizing gravity acceleration, a type using a liquid surface level configured to detect a surface of liquid contained in a chamber which varies according to the rolling angle as a change in electrostatic capacitance, etc. may be employed. In the case of using the liquid surface level type, if an arrangement is provided for visualizing such liquid surface change, then, the tilt detector 8 and the display device 60 can be integrated into one unit.

Figure 6:
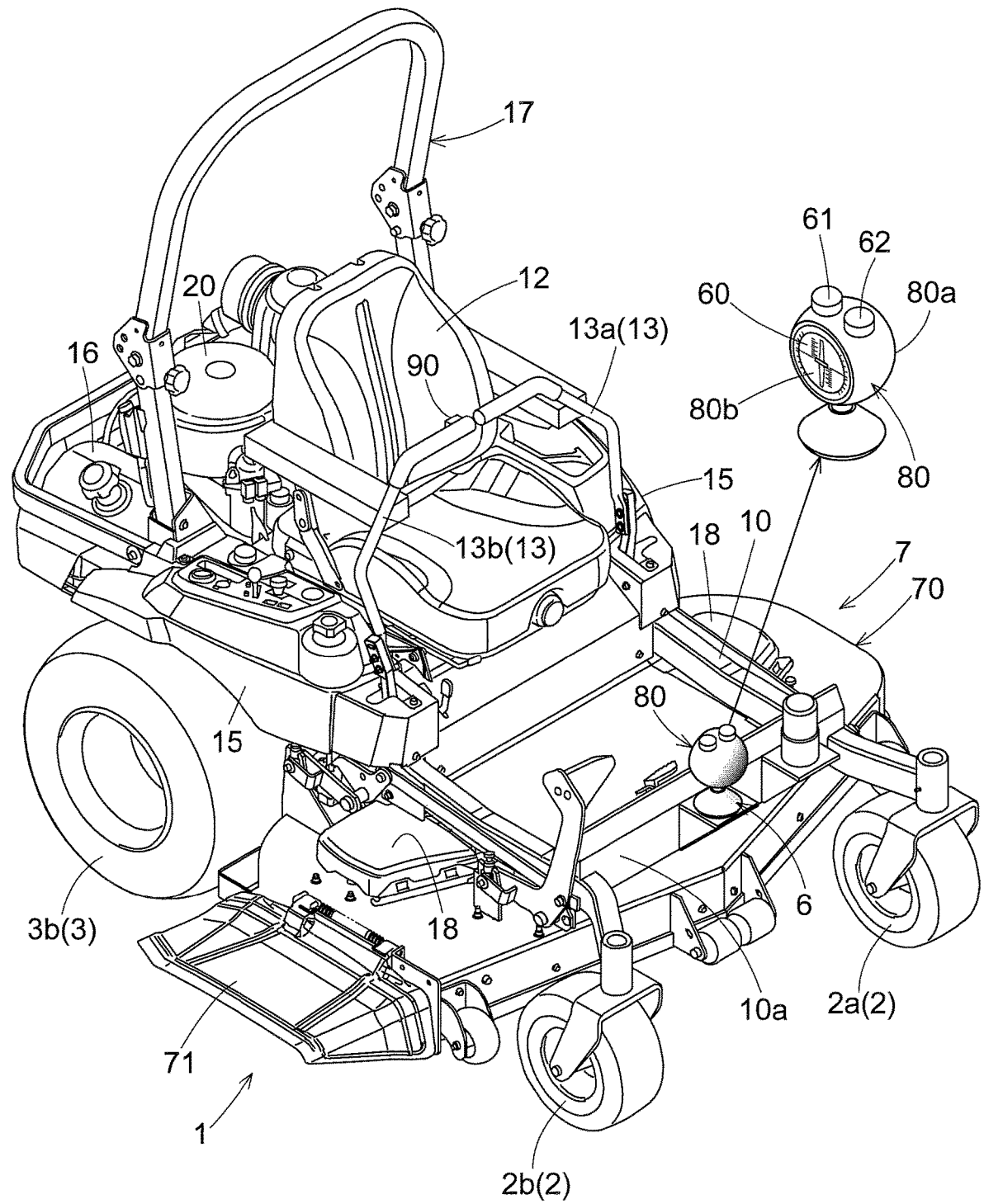
FIG. 6 is a perspective view of a grass mower which mounts an integrated type tilt alarming unit.

FIG. 6 shows a grass mower in which a tilt alarm unit 80 integrating the tilt detector 8, the display device 60, the first informing device 61 and the second informing device 62 altogether is attached to the front cross beam 10a. The tilt alarming unit 80 includes a casing 80a. As the tilt detector 8, a liquid surface level meter is employed. And, as the display device 60, a graduated viewing window 80b for visualizing a change in the liquid surface of the liquid surface level meter is provided in a lateral face of the casing 80a. Further, an orange-colored LED as the first informing device 61 and a red-colored LED as the second informing device 62 are provided on the top face of the casing.

Incidentally, the arrangements disclosed in the foregoing embodiment (including the further embodiments) can be used in combination with any combination disclosed in the other embodiments unless contradiction results from such combining. Further, the embodiments disclosed in this detailed description are illustrative and the present invention is not limited thereto, but various modifications thereof can be made when appropriate within a range not departing from the object of the invention.

The invention claimed is:

1. A grass mower comprising:
   a frame that extends in a front/rear direction of a machine body;
   at least one steering control lever pivotally mounted to the frame configured to control steering direction of the grass mower;
   a mower deck supported to/under the frame, the mower deck extending in a transverse direction of the machine body, a side edge of the mower deck protruding laterally from the machine body;
   a tilt detector for detecting a rolling angle of the machine body;
   a display device for displaying the rolling angle, the display device mounted to the frame at a first position;
   a first informing device configured to effect a first informing to call attention to grass scraping by the side edge when a rolling angle detected by the tilt detector exceeds a first tilt angle;
   a second informing device configured to effect a second informing to call attention to traveling danger when the rolling angle detected by the tilt detector exceeds a second tilt angle; and
   a suspension device configured to suspend the first informing device from effecting the first informing for a predetermined period even when the detected rolling angle remains exceeding the first tilt angle, wherein the suspension device is operated by a manually operable operator control mounted to the at least one steering control lever at a second position spaced from the first position.

2. The grass mower of claim 1, wherein the second tilt angle is equal to or greater than the first tilt angle.

3. The grass mower of claim 1, wherein the first informing and the second informing are provided as being distinguishable from each other by the driver.

4. The grass mower of claim 1, wherein the first informing device and the second informing device are configured as a common informing device.

5. The grass mower of claim 3, wherein the first informing device and the second informing device are accommodated in a common housing.

\* \* \* \* \*